United States Patent
Hiratsuka et al.

(10) Patent No.: US 9,701,237 B2
(45) Date of Patent: Jul. 11, 2017

(54) IRRADIATION SYSTEM THAT CONTROLS HEADLAMPS OF A VEHICLE

(71) Applicant: TOYOTA JIDOSHA KABUSHIKI KAISHA, Toyota-shi, Aichi-ken (JP)

(72) Inventors: Shigeyoshi Hiratsuka, Nagakute (JP); Nobuyuki Shiraki, Nagakute (JP); Keiichi Shimaoka, Nagakute (JP); Kazunori Higuchi, Nagakute (JP); Kazuya Asaoka, Seto (JP); Sho Masuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 14/822,503

(22) Filed: Aug. 10, 2015

(65) Prior Publication Data
US 2016/0039331 A1 Feb. 11, 2016

(30) Foreign Application Priority Data
Aug. 8, 2014 (JP) .................. 2014-162395

(51) Int. Cl.
- *B60R 22/00* (2006.01)
- *E05F 15/00* (2015.01)
- *G05D 1/00* (2006.01)
- *B60Q 1/08* (2006.01)

(Continued)

(52) U.S. Cl.
CPC ............. *B60Q 1/085* (2013.01); *B60Q 1/143* (2013.01); *G06K 9/00825* (2013.01); *B60Q 2300/056* (2013.01); *B60Q 2300/42* (2013.01)

(58) Field of Classification Search
None
See application file for complete search history.

(56) References Cited

U.S. PATENT DOCUMENTS

| | | | | |
|---|---|---|---|---|
| 6,343,869 B1 * | 2/2002 | Kobayashi | ............. | B60Q 1/085 315/77 |
| 6,820,897 B2 * | 11/2004 | Breed | ................... | B60R 21/015 280/735 |

(Continued)

FOREIGN PATENT DOCUMENTS

| | | |
|---|---|---|
| EP | 2 551 155 A2 | 1/2013 |
| JP | 2003-054311 A | 2/2003 |

(Continued)

*Primary Examiner* — Nicholas Kiswanto
*Assistant Examiner* — Kenny A Taveras
(74) *Attorney, Agent, or Firm* — Oliff PLC

(57) ABSTRACT

An irradiation system includes: a light position detection unit that detects a light position of an oncoming vehicle from a captured image; a driver position calculation unit that calculates a position upward and shifted in a first direction by a first distance from the light position detected by the light position detection unit, as a driver position; a shaded area generation unit that generates a first area having vertices respectively set at the light position, the driver position and a position shifted in a second direction, opposite to the first direction, by a distance between a pair of lights in the predetermined vehicle from the driver position, as a shaded area; and an irradiation unit that irradiates an area ahead of the host vehicle while shading the shaded area generated by the shaded area generation unit.

9 Claims, 10 Drawing Sheets

(51) Int. Cl.
*B60Q 1/14* (2006.01)
*G06K 9/00* (2006.01)

(56) References Cited

U.S. PATENT DOCUMENTS

| | | | | |
|---|---|---|---|---|
| 8,562,192 B2* | 10/2013 | Tatara | ................ | B60Q 1/12 |
| | | | | 362/509 |
| 9,328,886 B2* | 5/2016 | Guan | ................ | F21S 48/10 |
| 9,387,796 B2* | 7/2016 | Imaeda | ................ | B60Q 1/143 |
| 2008/0024325 A1* | 1/2008 | Kobayashi | ........ | G06K 9/00825 |
| | | | | 340/939 |
| 2009/0279317 A1* | 11/2009 | Tatara | ................ | B60Q 1/12 |
| | | | | 362/465 |
| 2012/0271511 A1* | 10/2012 | Dierks | ................ | B60Q 1/143 |
| | | | | 701/36 |
| 2013/0175926 A1* | 7/2013 | Katsuno | ................ | B60Q 1/085 |
| | | | | 315/82 |
| 2013/0177202 A1* | 7/2013 | Dierks | ................ | B60Q 1/143 |
| | | | | 382/103 |
| 2013/0218413 A1* | 8/2013 | Tanaka | ................ | B60Q 1/143 |
| | | | | 701/36 |
| 2014/0063824 A1* | 3/2014 | Guan | ................ | B60Q 9/008 |
| | | | | 362/464 |
| 2014/0355280 A1* | 12/2014 | Fujiyoshi | ........... | B60Q 1/143 |
| | | | | 362/465 |
| 2015/0302737 A1* | 10/2015 | Geerlings | ........... | G08C 17/02 |
| | | | | 340/5.25 |
| 2016/0039331 A1* | 2/2016 | Hiratsuka | ........... | B60Q 1/085 |
| | | | | 701/49 |
| 2016/0238210 A1* | 8/2016 | Masuda | ................ | B60Q 1/0017 |
| 2016/0250964 A1* | 9/2016 | Takagaki | ................ | B60Q 1/08 |

FOREIGN PATENT DOCUMENTS

| | | |
|---|---|---|
| JP | 2010-221756 A | 10/2010 |
| JP | 2011-175920 A | 9/2011 |
| JP | 2013-023182 A | 2/2013 |
| JP | 2013-184614 A | 9/2013 |

* cited by examiner

VEHICLE CENTER

GENERATION OF TRIANGULAR AREA

○ : DRIVER'S HEAD POSITION
○ : HEADLAMP (TURNED ON)
⊗ : HEADLAMP (MISSING)

GENERATION OF QUADRILATERAL AREA

○ : DRIVER'S HEAD POSITION
○ : HEADLAMP (TURNED ON)
⊗ : HEADLAMP (MISSING)

PASSENGER-SIDE LIGHT IS MISSING
WHEN ONE-SIDE LIGHT IS TURNED ON

EXAMPLE IN WHICH
LIGHT IS IRRADIATED TOWARD
ONCOMING VEHICLE WITH
GENERATED QUADRILATERAL AREA

DRIVER-SIDE LIGHT IS MISSING
WHEN ONE-SIDE LIGHT IS TURNED ON

EXAMPLE IN WHICH
LIGHT IS IRRADIATED TOWARD
ONCOMING VEHICLE WITH
GENERATED QUADRILATERAL AREA

PASSENGER-SIDE LIGHT IS MISSING
WHEN ONE-SIDE LIGHT IS TURNED ON

DRIVER-SIDE LIGHT IS MISSING
WHEN ONE-SIDE LIGHT IS TURNED ON $S = 2 \times d_{light} \times d_{height}$

PASSENGER-SIDE LIGHT IS MISSING
WHEN ONE-SIDE LIGHT IS TURNED ON

EXAMPLE IN WHICH
LIGHT IS IRRADIATED TOWARD
ONCOMING VEHICLE WITH
GENERATED TRIANGULAR AREA

DRIVER-SIDE LIGHT IS MISSING
WHEN ONE-SIDE LIGHT IS TURNED ON

EXAMPLE IN WHICH
LIGHT IS IRRADIATED TOWARD
ONCOMING VEHICLE WITH
GENERATED TRIANGULAR AREA

PASSENGER-SIDE LIGHT IS MISSING

DRIVER-SIDE LIGHT IS MISSING

DRIVER IS RELIABLY SHADED EVEN WHEN ONLY ONE-SIDE LIGHT IS TURNED ON → REDUNDANT SHADING OCCURS

DRIVER IS RELIABLY SHADED EVEN WHEN ONLY ONE-SIDE LIGHT IS TURNED ON → REDUNDANT SHADING OCCURS

IRRADIATION SYSTEM THAT CONTROLS HEADLAMPS OF A VEHICLE

INCORPORATION BY REFERENCE

The disclosure of Japanese Patent Application No. 2014-162395 filed on Aug. 8, 2014 including the specification, drawings and abstract is incorporated herein by reference in its entirety.

BACKGROUND OF THE INVENTION

1. Field of the Invention

The invention relates to an irradiation system and, more particularly, to an irradiation system that controls headlamps of a vehicle.

2. Description of Related Art

Generally, in a headlamp system for a vehicle, a driver manually changes headlamps (or headlights) between low beam and high beam. High beam provides an excellent visibility for a driver; however, high beam dazzles a driver of an oncoming vehicle or a pedestrian. Therefore, it is required to appropriately switch between high beam and low beam.

In Japanese Patent Application Publication No. 2003-54311 (JP 2003-54311 A), there is suggested a technique for, when it is determined that there is a person in a left-side detection area with respect to a traveling direction of a vehicle, controlling the irradiation range, irradiation direction or illuminance of an illumination unit so as to reduce dazzle of the person.

In the related technique, in order not to dazzle a driver of an oncoming vehicle by controlling the irradiation range of the illumination unit, as shown in FIG. 10A, a shaded area 105a for preventing dazzle of a driver 104 on the basis of the positions of headlamps 102, 103 of an oncoming vehicle 101 is generated.

However, in the above-described related technique, when only one lamp of the oncoming vehicle has been detected because of, for example, a failure of the driver-side headlamp of the oncoming vehicle, it is not possible to shade the driver of the oncoming vehicle, and it is not possible to prevent dazzle.

For example, as shown in FIG. 10B, when only the driver 104-side headlamp 102 of the oncoming vehicle 101 has been detected because of, for example, a failure of the passenger-side headlamp of the oncoming vehicle 101, it is possible to shade the driver 104 of the oncoming vehicle 101 with a shaded area 105b. However, as shown in FIG. 10C, when only the passenger-side headlamp 103 of the oncoming vehicle 101 has been detected because of, for example, a failure of the driver 104-side headlamp of the oncoming vehicle 101, it is not possible to shade the driver 104 of the oncoming vehicle 101, and it is not possible to prevent dazzle.

When shading is carried out with a rectangular shaded area at the time when only the light of a single headlamp has been detected, it is not possible to determine at which side the detected light is placed, the right side or the left side. Therefore, in order to reliably prevent dazzle of the driver of the oncoming vehicle, as shown in FIG. 10D and FIG. 10E, it is required to generate a redundant shaded area 106 or a redundant shaded area 107.

SUMMARY OF THE INVENTION

An irradiation system according to an aspect of the present invention includes: a light position detection unit configured to detect a light position of an oncoming vehicle from a captured image captured by an imaging device configured to capture an image ahead of a host vehicle; a driver position calculation unit configured to calculate a position upward by a difference in height between each of light positions and a driver's face position in a predetermined vehicle and shifted in a first direction by a first distance from the light position detected by the light position detection unit, as a driver position; a shaded area generation unit configured to generate a first area having vertices respectively set at the light position, the driver position and a position shifted in a second direction, opposite to the first direction, by a distance between a pair of lights in the predetermined vehicle from the driver position, as a shaded area; and an irradiation unit configured to irradiate an area ahead of the host vehicle while shading the shaded area generated by the shaded area generation unit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A is a view that illustrates an example of a shaded state for an oncoming vehicle with the quadrilateral area generated by the quadrilateral area generation processing unit in FIG. 1 and the case where a passenger-side light is missing when only one-side light is turned on;

FIG. 3B is a view that illustrates an example of a shaded state for an oncoming vehicle with the quadrilateral area generated by the quadrilateral area generation processing unit in FIG. 1 and the case where a driver-side light is missing when only one-side light is turned on;

FIG. 4A is a view that illustrates an example of calculation of the area of the quadrilateral area generated by the quadrilateral area generation processing unit in FIG. 1 and the case where the passenger-side light is missing when only one-side light is turned on;

FIG. 4B is a view that illustrates an example of calculation of the area of the quadrilateral area generated by the quadrilateral area generation processing unit in FIG. 1 and the case where the driver-side light is missing when only one-side light is turned on;

FIG. 7A is a view that illustrates an example of a shaded state for an oncoming vehicle with a triangular area generated by an area generation processing unit in FIG. 6 and an example of calculation of the area of the triangular area and the case where a passenger-side light is missing when only one-side light is turned on;

FIG. 7B is a view that illustrates an example of a shaded state for an oncoming vehicle with a triangular area generated by the area generation processing unit in FIG. 6 and an example of calculation of the triangular area and the case where a driver-side light is missing when only one-side light is turned on;

DETAILED DESCRIPTION OF EMBODIMENTS

Hereinafter, embodiments of the invention will be described in detail with reference to the accompanying drawings.

First Embodiment

Figure 1:
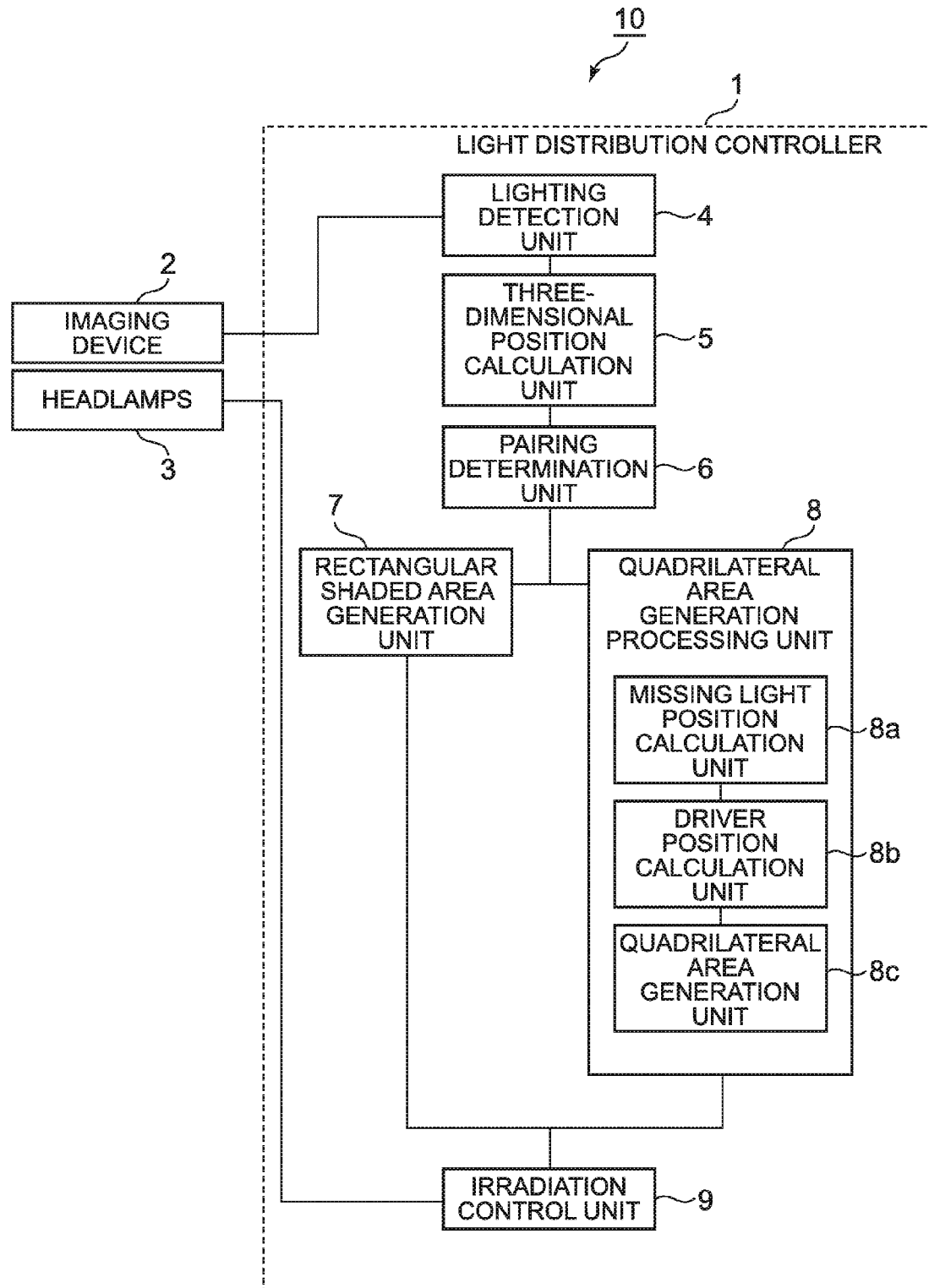
FIG. 1 is a block diagram that shows the configuration of a light distribution controller according to a first embodiment of the invention.

FIG. 1 shows a configuration example of a light distribution controller as an irradiation system according to a first embodiment. In the first embodiment, the case where the invention is applied to an in-vehicle illumination system that is mounted on a vehicle and that controls illumination of headlamps each formed of an LED matrix lamp on the basis of a captured image ahead of the vehicle will be described as an example.

As shown in FIG. 1, the in-vehicle illumination system 10 according to the first embodiment includes an imaging device 2 and the light distribution controller 1. The imaging device 2 is formed of, for example, a CCD camera that captures an image ahead of the host vehicle. The light distribution controller 1 controls illumination of the headlamps 3 on the basis of the captured forward image. The headlamps 3 serve as an irradiation unit according to the invention. Each of the headlamps 3 is formed of the LED matrix lamp provided in the host vehicle. An image that is output from the imaging device 2 may be a gray image or a color image.

The light distribution controller 1 includes a central processing unit (CPU), a read only memory (ROM), a random access memory (RAM), and a bus. The ROM stores programs, and the like, for causing the CPU to execute light distribution control processing operation according to the invention. The RAM stores data, and the like. The bus connects these components. The light distribution controller 1 includes a lighting detection unit 4, a three-dimensional position calculation unit 5, a pairing determination unit 6, a rectangular shaded area generation unit 7, a quadrilateral area generation processing unit 8 and an irradiation control unit 9 as functions that are implemented by computer processing on the basis of the programs. The lighting detection unit 4 and the three-dimensional position calculation unit 5 are an example of a light position detection unit according to the invention.

The lighting detection unit 4 detects headlamps of an oncoming vehicle by using a pattern recognition method, or the like, from an image captured by the imaging device 2.

The three-dimensional position calculation unit 5 calculates the three-dimensional positions of the headlamps with respect to the host vehicle on the basis of the headlamps of the oncoming vehicle, detected by the lighting detection unit 4. When the optical axis of the imaging device 2 and the optical axis of the pair of headlamps of the host vehicle are in the same positional relationship, the two-dimensional positions of the headlamps may be calculated.

The pairing determination unit 6 performs pairing of adjacent headlamps on the basis of the three-dimensional positions of the headlamps of the oncoming vehicle, calculated by the three-dimensional position calculation unit 5, and determines whether only one-side light has been detected or both two lights have been detected. Such determination as to pairing of headlamps may be carried out by using a vehicle light determination method described in Japanese Patent Application Publication No. 2010-221756 (JP 2010-221756 A). For example, when one-side headlamp of the oncoming vehicle is not turned on because of a failure or when only one-side light of the oncoming vehicle has been detected by the lighting detection unit 4, it is determined that only one-side light has been detected.

When the pairing determination unit 6 determines that both two lights of the oncoming vehicle have been detected, the rectangular shaded area generation unit 7 calculates the vehicle width of the oncoming vehicle on the basis of the position of each of the two lights, and generates a rectangular area having a width adapted to the calculated vehicle width and a predetermined height.

When the pairing determination unit 6 determines that only one-side light of the oncoming vehicle has been detected, the quadrilateral area generation processing unit 8 generates a quadrilateral area, obtained by combining two triangles each having a vertex corresponding to the position of the detected one-side light, as a shaded area.

The irradiation control unit 9 generates an irradiation pattern such that the rectangular area generated by the rectangular shaded area generation unit 7 or the quadrilateral area generated by the quadrilateral area generation processing unit 8 is set as the shaded area, and controls the headlamps of the host vehicle. For example, the irradiation pattern for reducing the illuminance of a portion that is irradiated by the headlamps of the host vehicle and that corresponds to the shaded area is generated, and then irradiation control is executed.

The quadrilateral area generation processing unit 8 includes a missing light position calculation unit 8a, a driver position calculation unit 8b and a quadrilateral area generation unit 8c as functions that are implemented by computer processing based on programs.

The missing light position calculation unit 8a calculates a missing light position shifted rightward from the light position detected by the lighting detection unit 4 and calculated by the three-dimensional position calculation unit 5 by the distance between a pair of lights in a predetermined vehicle.

The driver position calculation unit 8b calculates a position upward by the difference in height between each of light positions and a driver's face position in the predetermined standard vehicle and shifted rightward from the light position, detected by the lighting detection unit 4 and calculated by the three-dimensional position calculation unit 5, by the difference between the distance from each of the light positions to a vehicle center in the predetermined standard vehicle and the distance in the lateral direction from the vehicle center to the driver's face position in the predetermined vehicle, as a driver position.

The quadrilateral area generation unit 8c generates a quadrilateral area by combining two triangular areas. The vertices of one of the two triangular areas are respectively set at the light position detected by the lighting detection unit 4 and calculated by the three-dimensional position calculation unit 5, the missing light position calculated by the missing light position calculation unit 8a, and the driver position calculated by the driver position calculation unit 8b. The vertices of the other one of the two triangular areas are respectively set at the light position, the driver position and a position shifted leftward from the driver position by the distance between the pair of lights in the predetermined standard vehicle.

The operation of the process of generating a quadrilateral shaded area by the quadrilateral area generation processing unit 8 will be described with reference to FIG. 2A and FIG. 2B.

The case where the oncoming vehicle is a right-hand drive will be described as an example.

Figure 2A:
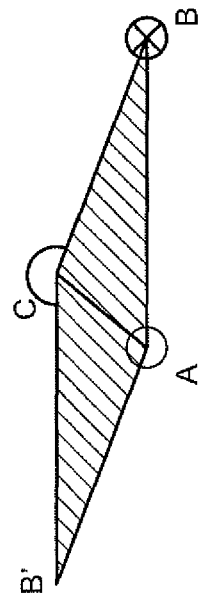
FIG. 2A is a view that illustrates a step of generating a triangular area, which is one step of an operation example of the process of generating a quadrilateral area as a shaded area by a quadrilateral area generation processing unit in FIG. 1.

As shown in FIG. 2A, the quadrilateral area generation processing unit 8 sets the light position A of the oncoming vehicle, detected by the lighting detection unit 4 and calculated by the three-dimensional position calculation unit 5, as the lower left vertex of a triangle. The quadrilateral area generation processing unit 8 defines the distance from the vehicle center to each of the light positions A, B in the predetermined standard vehicle as $d_{light}$. The quadrilateral area generation processing unit 8 defines the distance to the position shifted rightward by the difference between the distance ($d_{light}$) from the light position A to the vehicle center in the predetermined standard vehicle and the distance in the lateral direction from the vehicle center to the driver's face position C in the predetermined vehicle, that is, the distance from the vehicle center to the driver's face position C, as $d_{driver}$. The quadrilateral area generation processing unit 8 defines the difference in height from each of the light positions A, B to the driver's face position C in the predetermined standard vehicle as $d_{height}$. The quadrilateral area generation processing unit 8 generates a triangular area ABC having a base length of $2 \times d_{light}$ and a height of $d_{height}$.

Figure 2B:
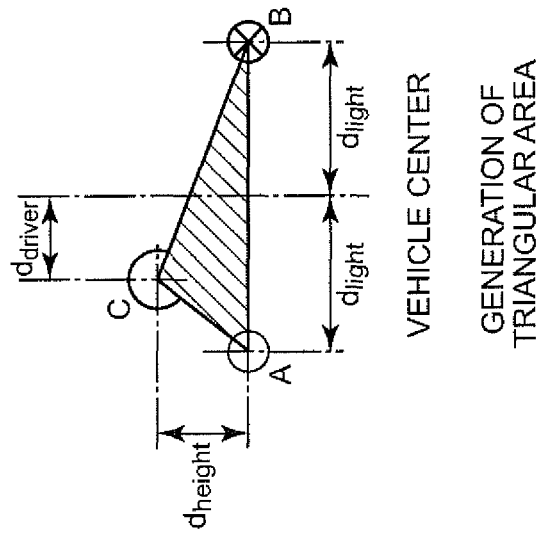
FIG. 2B is a view that illustrates a step of generating a quadrilateral area after the step of FIG. 2A, which is one step of the operation example of the process of generating a quadrilateral area as a shaded area by the quadrilateral area generation processing unit in FIG. 1.
Figure 2B:
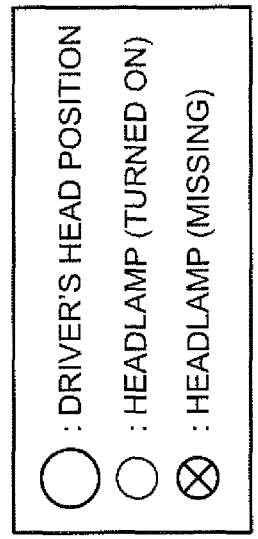

As shown in FIG. 2B, the quadrilateral area generation processing unit 8 generates a quadrilateral area by combining the thus generated triangular area ABC with a triangular area AB'C having vertices respectively set at the light position, the driver position and a position B' shifted leftward from the driver position by the distance between the pair of lights in the predetermined vehicle. That is, the quadrilateral area generation processing unit 8 generates a quadrilateral area by combining the generated triangular area ABC with the generated triangular area AB'C with the sides AC set to a diagonal line.

Figure 3A:
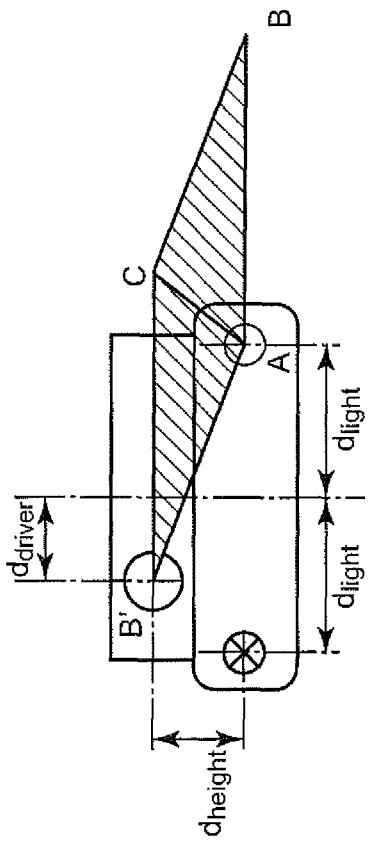
Figure 3B:
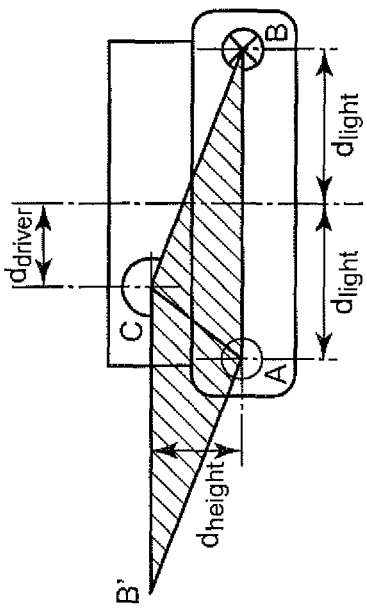

Irradiation of the headlamps of the host vehicle is controlled while the quadrilateral area generated by the quadrilateral area generation processing unit 8 is set as the shaded area. Thus, when one-side light has been detected in this way, irradiation of the headlamps of the host vehicle is controlled so as to form the shaded area in which the vertex A of each of the triangles is set at the position at which light has been detected, as shown in FIG. 3A and FIG. 3B. As a result, even in any one of the case where the driver-side light is missing or the case where the passenger-side light is missing, it is possible to prevent dazzle by shading the driver's face position of the right-hand drive oncoming vehicle.

Next, the area of the shaded area in the case where shading is carried out with the quadrilateral area generated by the quadrilateral area generation processing unit 8 at the time when only one driver-side headlamp of the oncoming vehicle has been detected will be described with reference to FIG. 4A to FIG. 4C.

Figure 4A:
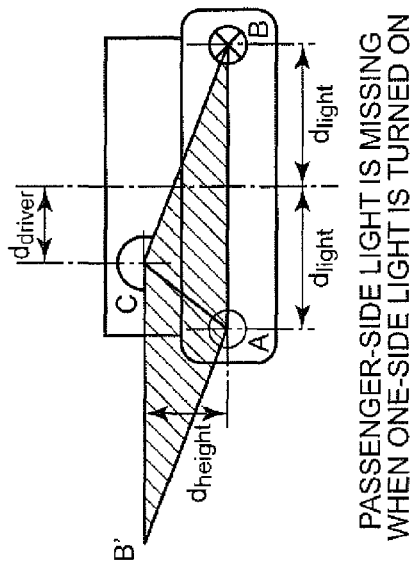
Figure 4B:
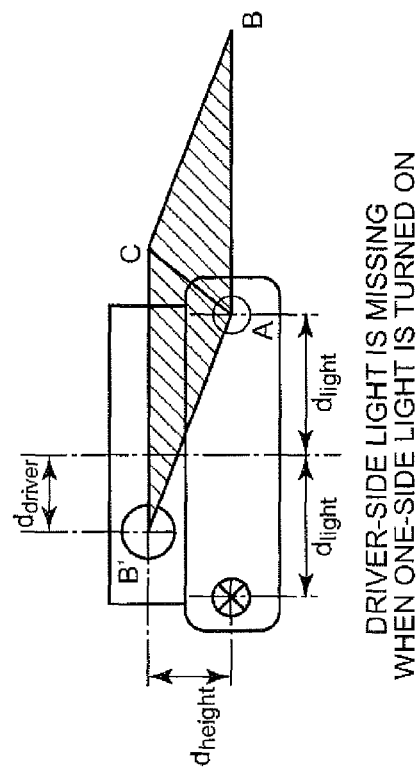
Figure 4C:
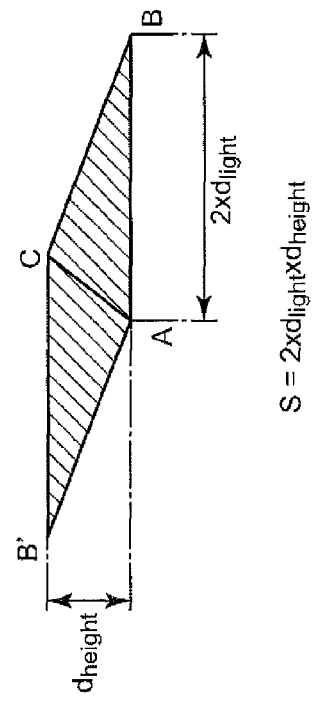
FIG. 4C is an example of calculation of the area of the quadrilateral area generated by the quadrilateral area generation processing unit in FIG. 1.

FIG. 4A to FIG. 4C show the headlamps and driver's head of the oncoming vehicle as points in a simple model and show the state where a redundant shaded portion ahead of the host vehicle for the oncoming vehicle is preferentially reduced.

The distance $d_{light}$ from the vehicle center to each light position in the predetermined oncoming vehicle is assumed to be longer than the distance $d_{driver}$ from the vehicle center to the driver in the predetermined oncoming vehicle ($d_{light} > d_{driver}$); however, the result will be the same even in the opposite magnitude relation.

FIG. 4A shows a quadrilateral shaded area in the case where only one driver-side headlamp of the oncoming vehicle has been detected. FIG. 4B shows a quadrilateral shaded area in the case where only one passenger-side headlamp of the oncoming vehicle has been detected. In any case, the driver's face portion of the oncoming vehicle is included in the shaded area.

The area S' of each of the quadrilateral shaded areas shown in FIG. 4A and FIG. 4B is calculated by "$2 \times d_{light} \times d_{height}$" as shown in FIG. 4C.

In any one of the quadrilateral shaded areas shown in FIG. 4A and FIG. 4B, the driver's face portion of the oncoming vehicle is included in the shaded area, so it is possible to reliably prevent dazzle of the driver of the oncoming vehicle. As a result, even when it is not possible to determine at which side the detected light is placed, the right side or the left side (the driver side or the passenger side), the area S' of the quadrilateral area required to reliably prevent dazzle of the driver of the oncoming vehicle is "$2 \times d_{light} \times d_{height}$".

In this way, by carrying out shading with the quadrilateral shaded area generated by the quadrilateral area generation processing unit 8, it is possible to reduce the area of the shaded area.

Figure 5:
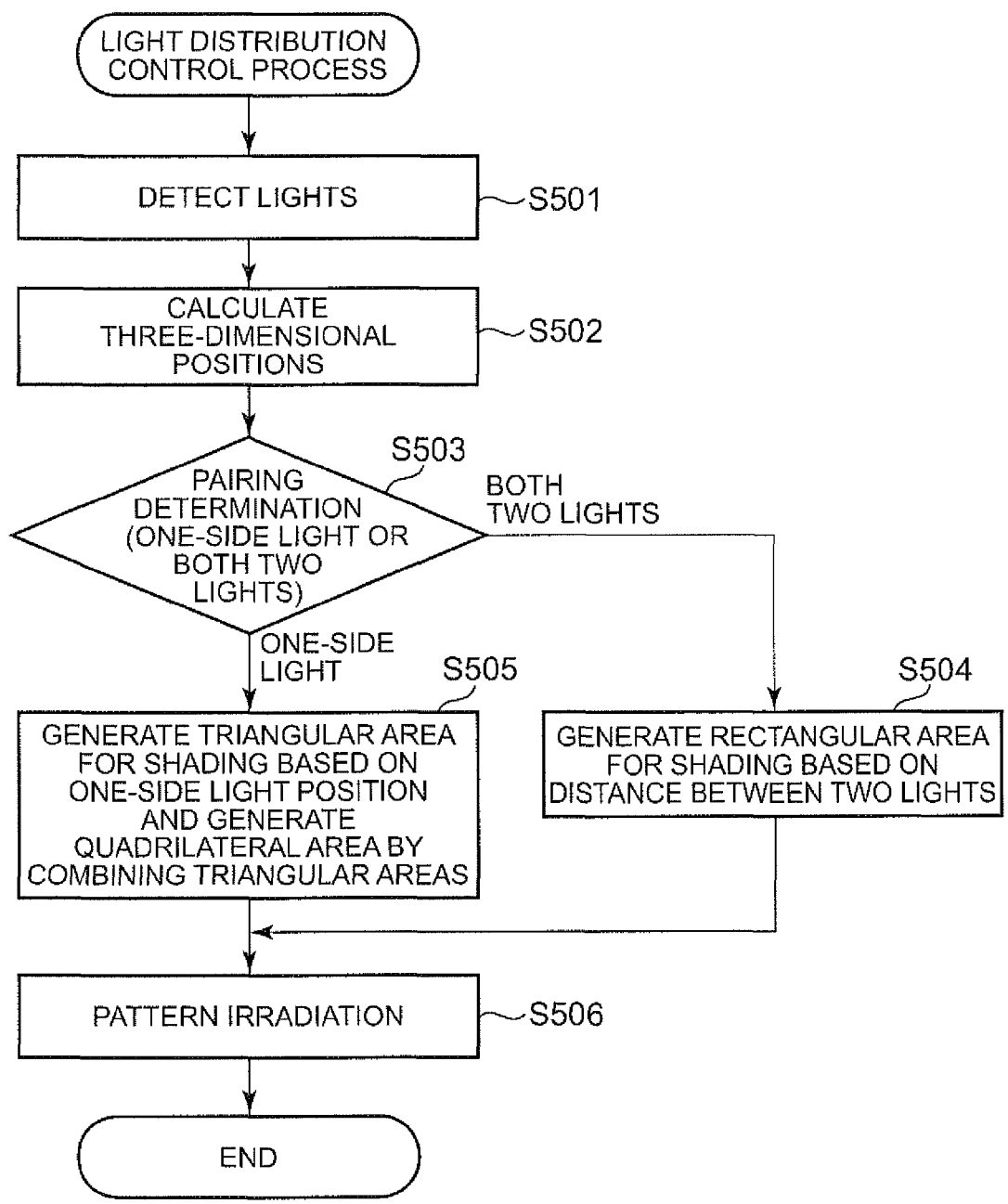
FIG. 5 is a flowchart that shows an example of a light distribution control process that is executed by the light distribution controller according to the embodiment.

Next, the light distribution control processing operation according to the invention by the lighting detection unit 4, three-dimensional position calculation unit 5, pairing determination unit 6, rectangular shaded area generation unit 7, quadrilateral area generation processing unit 8 and irradiation control unit 9 of the light distribution controller 1 will be described with reference to FIG. 5.

The lighting detection unit 4 detects lights of the headlamps of the oncoming vehicle by using a pattern recognition method, or the like, from the image captured by the imaging device 2 (step S501).

The three-dimensional position calculation unit 5 calculates the three-dimensional positions of the headlamps from the host vehicle on the basis of the headlamps of the oncoming vehicle, detected by the lighting detection unit 4 (step S502). When the optical axis of the imaging device 2 and the optical axis of the pair of headlamps of the host vehicle are in the same positional relationship, the two-dimensional positions of the headlamps may be calculated.

The pairing determination unit 6 carries out pairing of the adjacent headlamps on the basis of the three-dimensional positions calculated by the three-dimensional position calculation unit 5, and determines whether only one-side light has been detected or both two lights have been detected (step S503).

When both two lights of the oncoming vehicle have been detected through determination made by the pairing determination unit 6, the rectangular shaded area generation unit 7 calculates the vehicle width of the oncoming vehicle on the basis of the positions of the two lights, and generates a rectangular area having the predetermined height and a lateral width adapted to the calculated vehicle width, as the shaded area (step S504).

When the pairing determination unit 6 determines that only one-side light of the oncoming vehicle has been detected by the lighting detection unit 4, the quadrilateral area generation processing unit 8 generates a quadrilateral area obtained by combining two triangular areas each having the vertex at the position of the detected one-side light, as the shaded area (step S505).

The irradiation control unit 9 generates an irradiation pattern such that shading is carried out with the rectangular shaded area generated by the rectangular shaded area generation unit 7 or the quadrilateral shaded area generated by the quadrilateral area generation processing unit 8, and controls irradiation of the headlamps of the host vehicle (step S506).

Second Embodiment

Next, a second embodiment of the invention will be described with reference to FIG. 6. In the second embodiment, as in the case of the first embodiment, the case where the invention is applied to an in-vehicle illumination system that is mounted on a vehicle and that controls irradiation of headlamps each formed of an LED matrix lamp on the basis of a captured image ahead of the vehicle will be described as an example.

Figure 6:
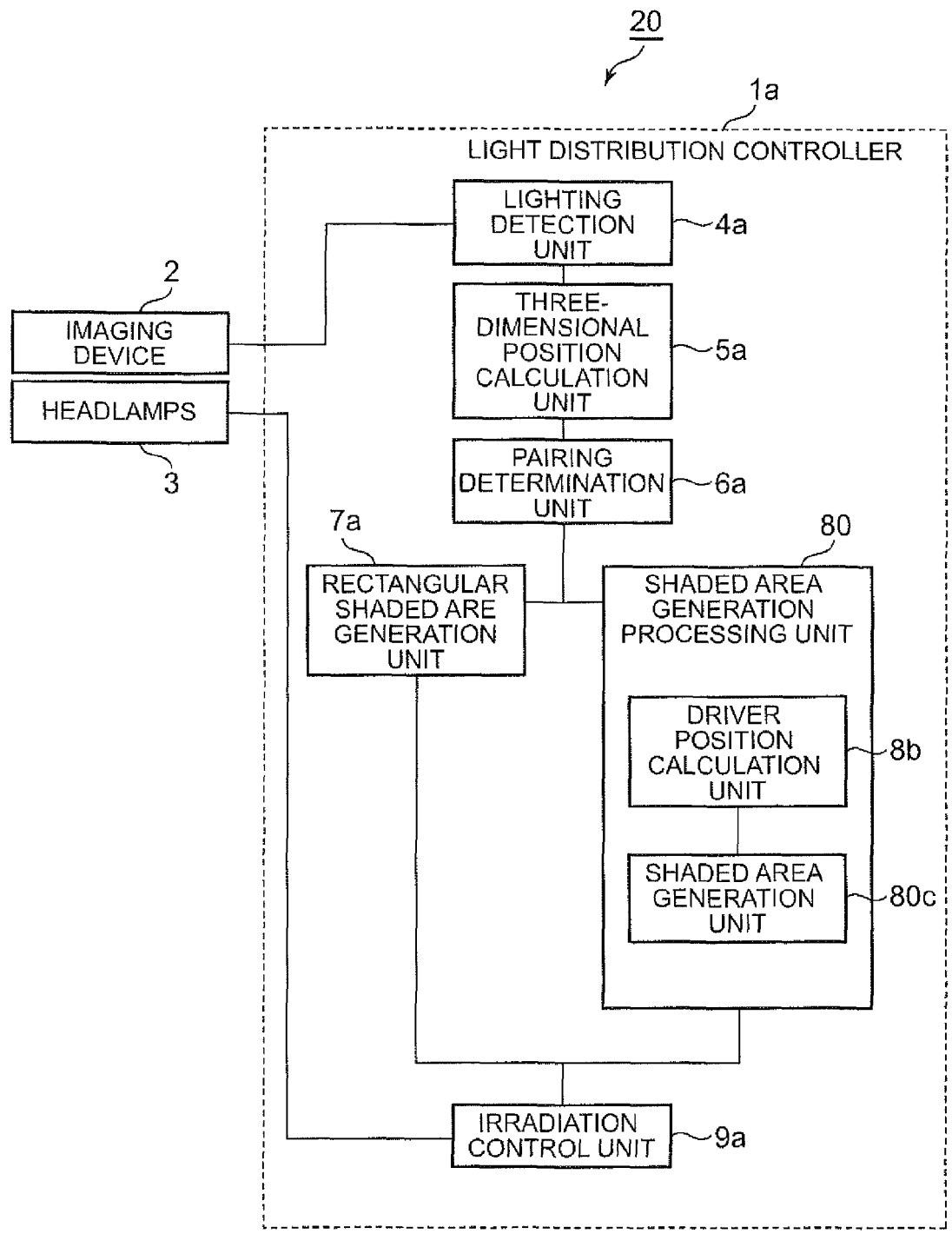
FIG. 6 is a block diagram that shows the configuration of a light distribution controller according to a second embodiment of the invention.

As shown in FIG. 6, the in-vehicle illumination system 20 according to the second embodiment includes a light distribution controller 1a as an irradiation system together with the imaging device 2 and the headlamps 3 similar to those of the in-vehicle illumination system 10 according to the first embodiment shown in FIG. 1.

The light distribution controller 1a, as well as the light distribution controller 1 of the in-vehicle illumination system 10 shown in FIG. 1, includes a CPU, a ROM, a RAM and a bus. The light distribution controller 1a includes a lighting detection unit 4a, a three-dimensional position calculation unit 5a, a pairing determination unit 6a, a rectangular shaded area generation unit 7a and an irradiation control unit 9a as functions that are implemented by computer processing based on programs, and includes a shaded area generation processing unit 80 instead of the quadrilateral area generation processing unit 8.

The shaded area generation processing unit 80 includes the driver position calculation unit 8b similar to that of the light distribution controller 1 of the in-vehicle illumination system 10 shown in FIG. 1, and includes a shaded area generation unit 80c instead of the quadrilateral area generation unit 8c.

The lighting detection unit 4a, the three-dimensional position calculation unit 5a, the pairing determination unit 6a and the rectangular shaded area generation unit 7a respectively operate similarly to the lighting detection unit 4, the three-dimensional position calculation unit 5, the pairing determination unit 6 and the rectangular shaded area generation unit 7 in the light distribution controller 1 of the in-vehicle illumination system 10 shown in FIG. 1. For example, when both two lights of the oncoming vehicle have been detected through determination made by the pairing determination unit 6a, the rectangular shaded area generation unit 7a calculates the vehicle width of the oncoming vehicle on the basis of the positions of the two lights, and generates a rectangular area having the predetermined height and the lateral width adapted to the calculated vehicle width, as the shaded area.

When it is determined that only one-side light of the oncoming vehicle has been detected through determination made by the pairing determination unit 6a, the shaded area generation processing unit 80 generates a triangular area having one vertex at the position of the detected one-side light, as the shaded area.

The irradiation control unit 9a generates an irradiation pattern such that the rectangular area generated by the rectangular shaded area generation unit 7a or the triangular area generated by the shaded area generation processing unit 80 is set for the shaded area, and controls irradiation of the headlamps of the host vehicle.

In the shaded area generation processing unit 80, the driver position calculation unit 8b calculates a position upward by the difference in height between each of the light positions and the driver's face position in the predetermined vehicle and shifted rightward from the light position detected by the lighting detection unit 4a and calculated by the three-dimensional position calculation unit 5a by the difference between the distance from each of the light positions to the vehicle center in the predetermined vehicle and the distance in the lateral direction from the vehicle center to the driver's face position in the predetermined vehicle, as a driver position.

The shaded area generation unit 80c generates a triangular area having vertices respectively set at the light position, the driver position and a position shifted leftward from the driver position by the distance between the pair of lights in the predetermined vehicle, as the shaded area.

The triangular shaded area that is generated by the shaded area generation processing unit 80 is the left-side triangular area AB'C in the drawing of the quadrilateral area generated by the light distribution controller 1 of the in-vehicle illumination system 10 in FIG. 1 and shown in FIG. 2A to FIG. 4C. In any case, the driver's face portion of the oncoming vehicle is included, so it is possible to prevent dazzle by shading the driver's face portion.

Particularly, the area of the triangular shaded area that is generated by the shaded area generation processing unit 80 is half the area of the quadrilateral shaded area generated by the light distribution controller 1 of the in-vehicle illumination system 10 according to the first embodiment shown in FIG. 2A to FIG. 4C, so it is possible to further reduce a redundant shaded area.

The operation of the process of generating the triangular shaded area by the shaded area generation processing unit 80 will be described with reference to FIG. 7A and FIG. 7B.

The case where the oncoming vehicle is a right-hand drive will be described as an example.

Figure 7A:
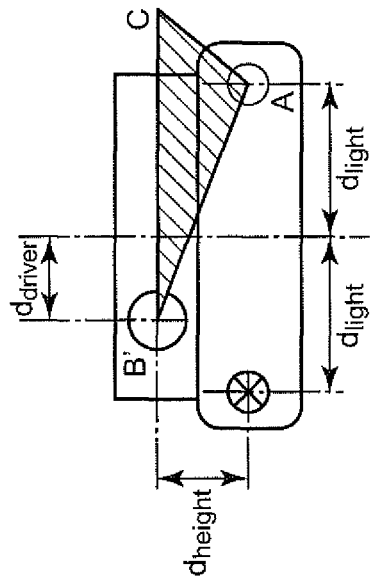

As shown in FIG. 7A, the driver position calculation unit 8b of the shaded area generation processing unit 80 calculates a position upward by the difference in height ($d_{height}$) between each of the light positions and the driver's face position in the predetermined vehicle and shifted rightward from a driver-side light position (A) detected by the lighting detection unit 4a and calculated by the three-dimensional position calculation unit 5a by the difference ($d_{light}$–$d_{driver}$) between the distance ($d_{light}$) from each of the light positions (A, B) to the vehicle center in the predetermined vehicle and the distance ($d_{driver}$) in the lateral direction from the vehicle center to the driver's face position in the predetermined vehicle, as a driver position (C).

The shaded area generation unit 80c generates a triangular area having vertices respectively set at the light position (A), the driver position (C) and a position (B') shifted leftward from the driver position (C) by the distance ($d_{light}$+$d_{light}$) between the pair of lights in the predetermined vehicle, as the shaded area.

In this way, the triangular shaded area (AB'C) that is generated by the shaded area generation processing unit 80 includes the driver's face portion (C) of the oncoming vehicle even when the passenger-side light is missing as shown in FIG. 7A, so it is possible to prevent dazzle by shading the driver's face portion.

Figure 7B:
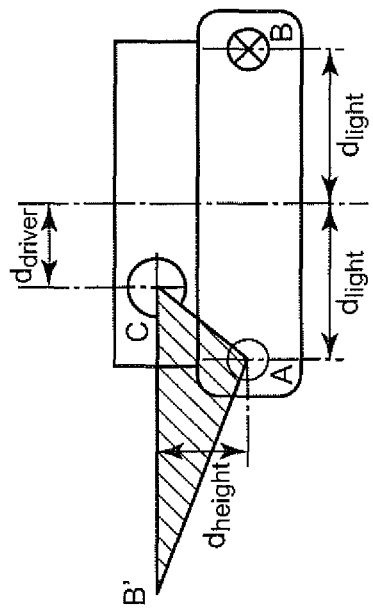

As shown in FIG. 7B, even when the driver-side light is missing, the triangular shaded area (AB'C) that is generated by the shaded area generation processing unit 80 includes the driver's face portion (B') of the oncoming vehicle, so it is possible to prevent dazzle by shading the driver's face portion.

Next, a position on the image plane of the shaded area and a position on a shading object at the time when the pair of headlamps 3 of the host vehicle in FIG. 1 and the imaging device 2 are installed such that the optical axis of the pair of headlamps 3 of the vehicle and the optical axis of the imaging device 2 are aligned with each other will be described with reference to FIG. 8.

Figure 8:
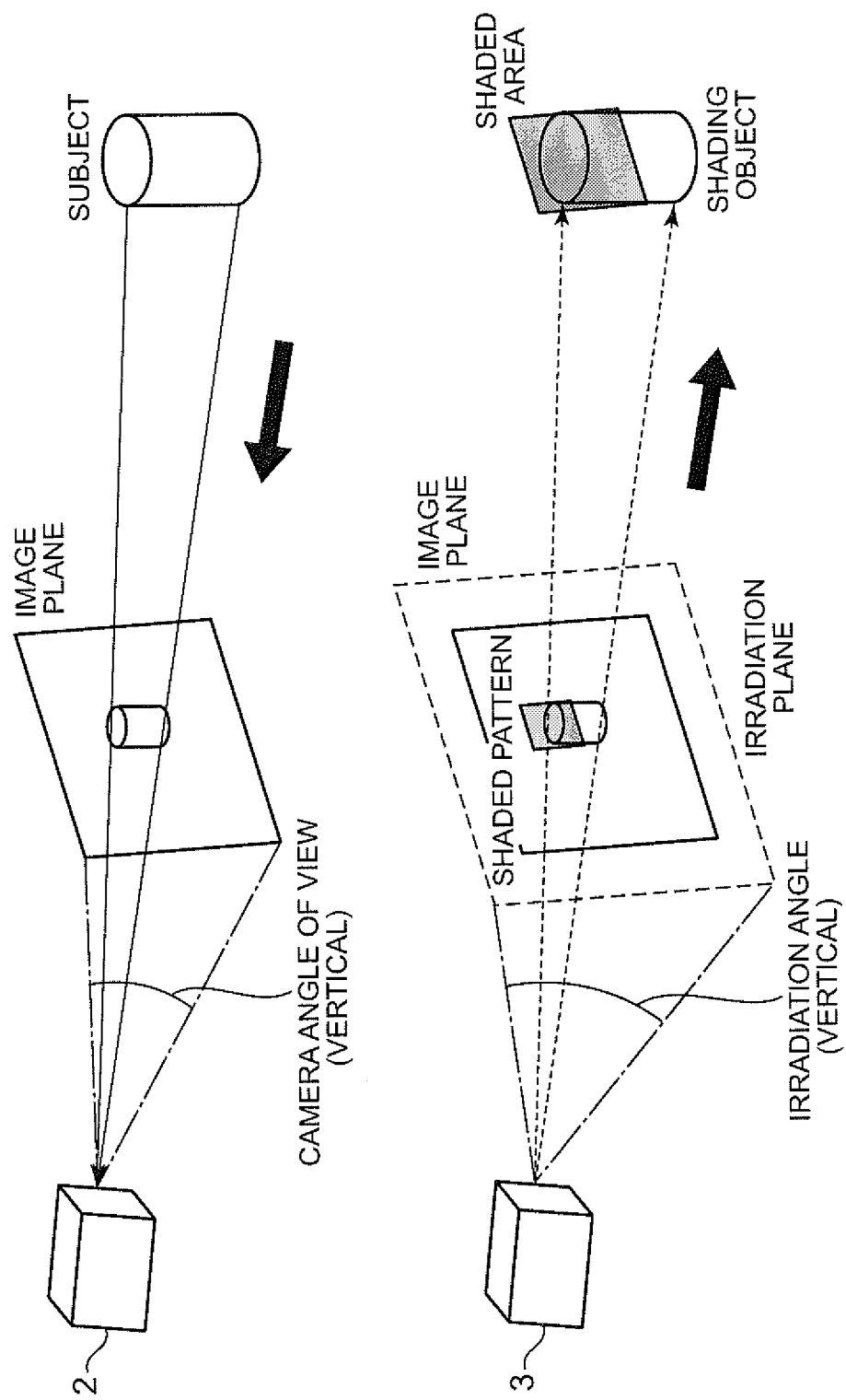
FIG. 8 is a view that illustrates an example of correspondence between a position on an image plane of the shaded area that is generated by the light distribution controller according to the embodiments and a position on a shading object.

As shown in FIG. 8, when the pair of headlamps 3 of the host vehicle in FIG. 1 and the imaging device 2 are installed such that the optical axis of the pair of headlamps 3 and the optical axis of the imaging device 2 (camera) are aligned with each other, the case where the imaging device 2 receives light from the pair of headlamps of the oncoming vehicle (subject) and the case where light is irradiated from the pair of headlamps 3 of the host vehicle toward the oncoming vehicle (shading object) are opposite processes. Because coordinate conversion due to the difference between the angle of view of the imaging device 2 (camera angle of view) and the irradiation angle of the pair of headlamps 3 is allowed to be carried out on a two-dimensional plane (screen), it is not required to obtain the distance between the host vehicle and the oncoming vehicle, and the distance between the host vehicle and the oncoming vehicle is unconcerned. It is possible to accurately set the position of the shaded area on the image plane and the position of the shaded area on the oncoming vehicle (shading object).

As described with reference to the drawings, in the light distribution controller according to the present embodiments, the light position of the oncoming vehicle is detected from the image captured by the imaging device that captures an image ahead of the host vehicle, and calculates the missing light position shifted rightward from the detected light position by the distance between the pair of lights in the predetermined vehicle. The position upward by the difference in height between each of the light positions and the driver's face position in the predetermined vehicle and shifted rightward from the detected light position by the difference between the distance from each of the light positions to the vehicle center in the predetermined vehicle and the distance in the lateral direction from the vehicle center to the driver's face position in the predetermined vehicle is calculated as the driver position. The quadrilateral area is generated by combining the triangular area having vertices respectively set at the light position, the missing light position and the driver position with the triangular area having vertices respectively set at the light position, the driver position and a position shifted leftward from the driver position by the distance between the pair of lights in the predetermined vehicle. The headlamps that irradiate an area ahead of the host vehicle are controlled such that the generated quadrilateral area is set as the shaded area.

The triangular area having vertices respectively set at the light position, the driver position and a position shifted leftward from the driver position by the distance between the pair of lights in the predetermined vehicle is generated, and the headlamps are controlled such that the generated triangular area is set as the shaded area.

When both the light positions of the pair of lights of the oncoming vehicle have been detected, the rectangular area is generated on the basis of the light positions of the pair of lights of the oncoming vehicle, and the headlamps are controlled such that the generated rectangular area is set as the shaded area; whereas, when one-side light position of the oncoming vehicle has been detected, the headlamps are controlled such that the generated quadrilateral area or triangular area is set as the shaded area.

With the above technique for generating the shaded area, it is possible to generate the shaded area that is able to prevent dazzle of the driver of the oncoming vehicle on the basis of only one-side headlamp of the oncoming vehicle, so, for example, it is possible to reliably prevent dazzle of the driver of the oncoming vehicle even when only one-side light is turned on in the oncoming vehicle.

The area of the shaded area that is generated in this way is reduced to half or a quarter in comparison with the area of the rectangular shaded area that is generated in the existing technique, so it is possible to improve visibility to another area by suppressing generation of a redundant shaded area.

The invention is not limited to the embodiments described with reference to the drawings, and may be applied in various forms without departing from the scope of the invention. For example, in the present embodiments the irradiation pattern in which the quadrilateral area or the triangular area is set as the shaded area is used. Instead, an irradiation pattern that uses an elliptical area or polygonal area that circumscribes the triangular area is set as the shaded area may be used.

Figure 9:
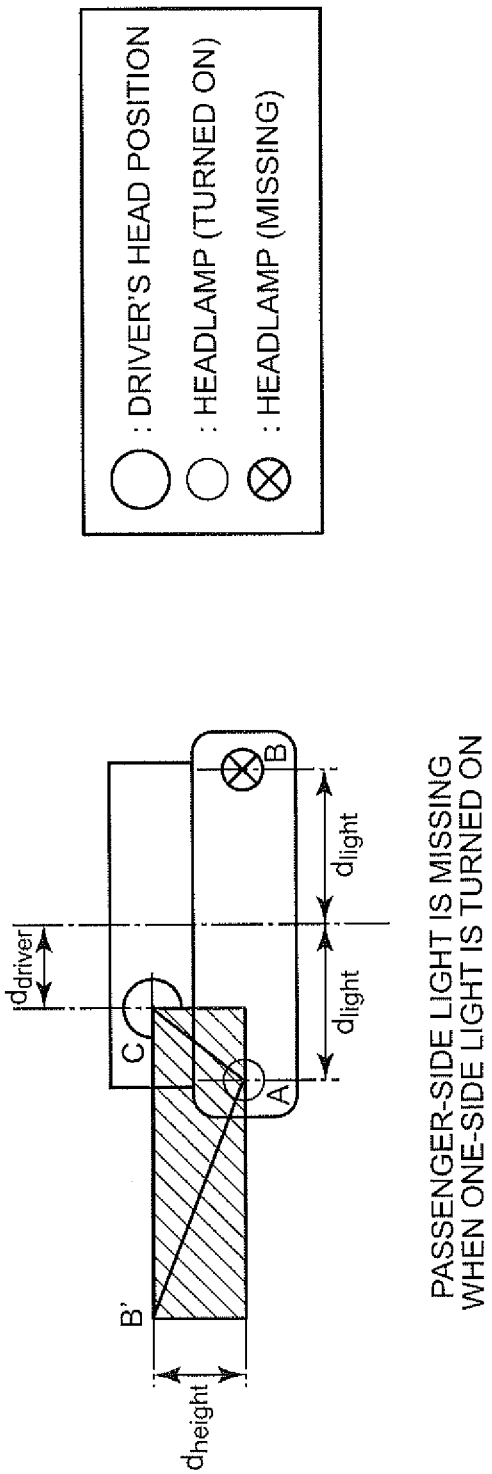
FIG. 9 is a view that illustrates an example of the process of generating a rectangular area by the area generation processing unit in FIG. 6 and an example of a shaded state for an oncoming vehicle with the generated rectangular area.
Figure 10A:
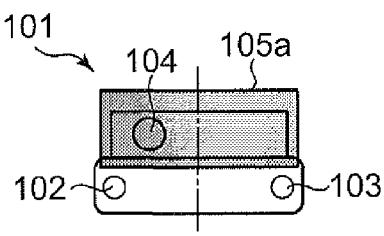
FIG. 10A is a view that illustrates an example of a shaded state for an oncoming vehicle with a rectangular area according to the related art.
Figure 10A:
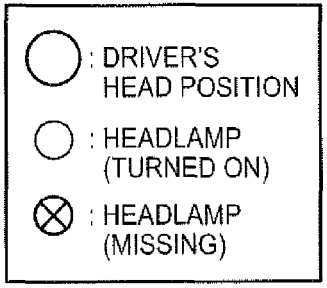
Figure 10B:
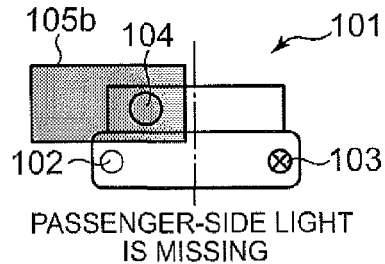
FIG. 10B is a view that illustrates an example of a shaded state for an oncoming vehicle with a rectangular area in the case where an observer's right-side headlamp is missing according to the related art.
Figure 10B:
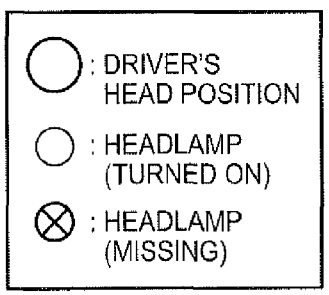
Figure 10C:
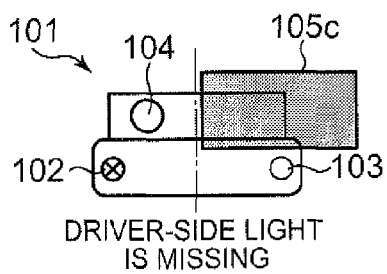
FIG. 10C is a view that illustrates an example of a shaded state for an oncoming vehicle with a rectangular area in the case where an observer's left-side headlamp is missing according to the related art.
Figure 10C:
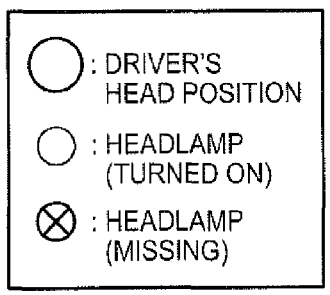
Figure 10D:
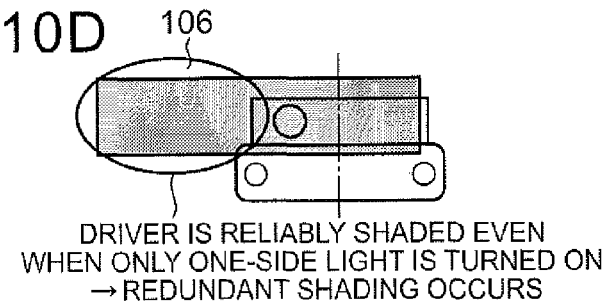
FIG. 10D is a view that illustrates an example of a shaded state for an oncoming vehicle with a rectangular area expanded to the observer's left side according to the related art.
Figure 10D:
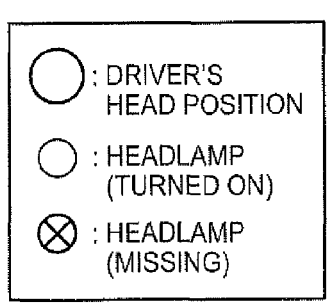
Figure 10E:
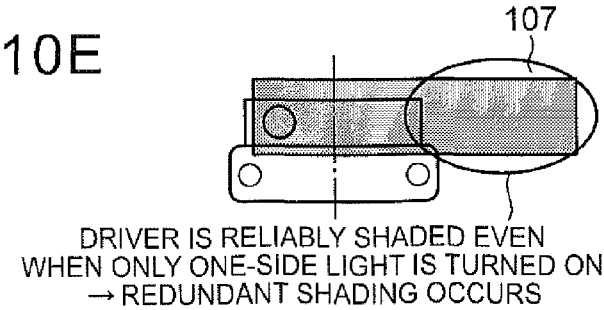
FIG. 10E is a view that illustrates an example of a shaded state for an oncoming vehicle with a rectangular area expanded to the observer's right side according to the related art.
Figure 10E:
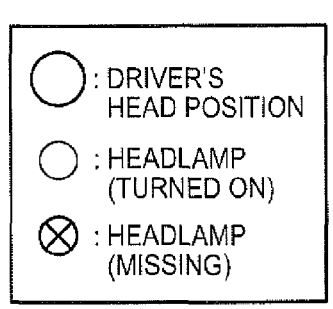

For example, as shown in FIG. 9, a rectangular area 91a that circumscribes the triangular area AB'C in FIG. 7A, generated by the shaded area generation processing unit 80 shown in FIG. 6, is generated, and the irradiation control unit 9a generates an irradiation pattern such that the rectangular area 91a is set as the shaded area, and controls irradiation of the headlamps of the host vehicle.

As shown in FIG. 9, the shaded area of the generated rectangular area 91a includes the driver's face portion (C) of the oncoming vehicle, so it is possible to prevent dazzle by shading the driver's face portion.

FIG. 9 also shows the headlamps and driver's head of the oncoming vehicle as points in a simple model, and shows the state where a redundant shaded portion ahead of the host vehicle for the oncoming vehicle is preferentially reduced.

The distance $d_{light}$ from the vehicle center to each light position in the predetermined oncoming vehicle is assumed to be longer than the distance $d_{driver}$ from the vehicle center to the driver in the predetermined oncoming vehicle ($d_{light} > d_{driver}$); however, the result will be the same even in the opposite magnitude relation.

The case where the position upward by the difference in height between each of the light positions and the driver's face position in the predetermined vehicle and shifted rightward from the detected light position by the difference between the distance from each of the light positions to the vehicle center in the predetermined vehicle and the distance in the lateral direction from the vehicle center to the driver's face position in the predetermined vehicle is calculated as the driver position is described as an example; however, the invention is not limited to this case. For example, a position upward by the difference in height between each of the light positions and the driver's face position in the predetermined vehicle and shifted rightward from the detected light position by a predetermined distance may be calculated as the driver position.

In the present embodiments, the case where the invention is applied to an example in which the oncoming vehicle is a right-hand drive is described; however, the invention may also be applied to the case where the oncoming vehicle is a left-hand drive.

For example, when the oncoming vehicle is a left-hand drive, the missing light position calculation unit 8a calculates a missing light position shifted leftward from the light position detected by the lighting detection unit 4 and calculated by the three-dimensional position calculation unit 5 by the distance between the pair of lights in the predetermined vehicle. The driver position calculation unit 8b calculates a position upward by the difference in height between each of the light positions and the driver's face position in the predetermined vehicle and shifted leftward from the light position detected by the lighting detection unit 4 and calculated by the three-dimensional position calculation unit 5 by a predetermined distance (for example, the difference between the distance from each of the light positions to the vehicle center in the predetermined vehicle and the distance in the lateral direction from the vehicle center to the driver's face position in the predetermined vehicle), as the driver position. The quadrilateral area generation unit 8c generates a quadrilateral area by combining a triangular area having vertices respectively set at the light position, the missing light position and the driver position with a triangular area having vertices respectively set at the light position, the driver position and a position shifted rightward from the driver position by the distance between the pair of lights in the predetermined vehicle. The irradiation control unit 9 controls the headlamps that irradiate an area ahead of the host vehicle such that the generated quadrilateral area is set as the shaded area.

The shaded area generation unit 80c generates a triangular area having vertices respectively set at the light position, the driver position and the position shifted rightward from the driver position by the distance between the pair of lights in the predetermined vehicle or an elliptical area or polygonal area that circumscribes the triangular area, and the irradiation control unit 9a controls the headlamps that irradiate an area ahead of the host vehicle such that the generated triangular area, elliptical area or polygonal area is set as the shaded area.

In each of the present embodiments, the functions of the light distribution controller according to the embodiment are implemented by the processes of the CPU based on the programs; however, the functions may be formed by hardware formed of logic element circuits.

What is claimed is:

1. An irradiation system comprising:
    a processor configured to:
        detect a light position of an oncoming vehicle from an image of a region ahead of a host vehicle captured by an imaging device;
        calculate a driver position of the oncoming vehicle by taking the light position of the oncoming vehicle, adding a height difference between a light position and a driver face position of a model vehicle, and shifting in a first direction by a first distance; and
        generate a first area having vertices at the light position of the oncoming vehicle, the driver position of the oncoming vehicle, and a third position at a location that is shifted from the driver position of the oncoming vehicle in a second direction, opposite to the first direction, by a distance between a pair of lights of the model vehicle; and
    an irradiator configured to irradiate an area ahead of the host vehicle while not irradiating the first area.

2. The irradiation system according to claim 1, wherein the first distance is a difference between a distance from the light position of the model vehicle to a vehicle center of the model vehicle and a lateral distance from the vehicle center of the model vehicle to the driver face position of the model vehicle.

3. The irradiation system according to claim 1, wherein the processor is configured to further generate an elliptical area or polygonal area that circumscribes the first area, and
the irradiator is further configured to not irradiate the elliptical area or polygonal area.

4. The irradiation system according to claim 1, wherein the processor is configured to:
    calculate a missing light position of the oncoming vehicle by taking the light position of the oncoming vehicle and shifting in the first direction by the distance between the pair of lights of the model vehicle, and
    generate a second area having vertices at the light position, the missing light position, and the driver position of the oncoming vehicle, and
the irradiator is further configured to not irradiate the second area.

5. The irradiation system according to claim 1, wherein the first direction is a rightward direction, and the second direction is a leftward direction from a perspective of the host vehicle.

6. The irradiation system according to claim 1, wherein the first direction is a leftward direction, and the second direction is a rightward direction from a perspective of the host vehicle.

7. The irradiation system according to claim 1, wherein the processor is configured to calculate the driver position of the oncoming vehicle using a difference between a distance from the light position of the model vehicle to a vehicle center of the model vehicle and a lateral distance from the vehicle center of the model vehicle to the driver face position of the model vehicle.

8. The irradiation system according to claim 1, wherein:
when one light position of the oncoming vehicle is detected:
the irradiator is configured to not irradiate the first area, and
when two light positions of a pair of lights of the oncoming vehicle are detected:
the processor is configured to generate a rectangular area based on the two light positions of the pair of lights of the oncoming vehicle, and
the irradiator is configured to not irradiate the rectangular area.

9. The irradiation system according to claim 1, wherein the imaging device and the irradiator are installed such that an optical axis of the imaging device and an optical axis of the irradiation unit are aligned with each other.

* * * * *